(12) United States Patent
Ramirez et al.

(10) Patent No.: US 12,554,503 B2
(45) Date of Patent: Feb. 17, 2026

(54) PROCESSOR PIPELINE FOR INTERLOCKED DATA TRANSFER OPERATIONS WITH VARIABLE LATENCY

(71) Applicant: Akeana, Inc., San Jose, CA (US)

(72) Inventors: Ricardo Ramirez, Sunnyvale, CA (US); Albert Anthony Martin, Sunnyvale, CA (US); Abhijit Sil, Dublin, CA (US); Rabin Sugumar, Sunnyvale, CA (US)

(73) Assignee: Akeana, Inc., Santa Clara, CA (US)

( * ) Notice: Subject to any disclaimer, the term of this patent is extended or adjusted under 35 U.S.C. 154(b) by 0 days.

(21) Appl. No.: 18/646,992

(22) Filed: Apr. 26, 2024

(65) Prior Publication Data

US 2025/0217151 A1    Jul. 3, 2025

Related U.S. Application Data

(60) Provisional application No. 63/570,281, filed on Mar. 27, 2024, provisional application No. 63/564,529, filed on Mar. 13, 2024, provisional application No. 63/563,492, filed on Mar. 11, 2024, provisional application No. 63/563,102, filed on Mar. 8, 2024, provisional application No. 63/556,944, filed on Feb.

(Continued)

(51) Int. Cl.
*G06F 9/30* (2018.01)
*G06F 9/38* (2018.01)

(52) U.S. Cl.
CPC ........ *G06F 9/3836* (2013.01); *G06F 9/30014* (2013.01); *G06F 9/3016* (2013.01)

(58) Field of Classification Search
CPC ............... G06F 9/3001; G06F 9/30014; G06F 9/30025; G06F 9/3826; G06F 9/3836; G06F 9/3838; G06F 9/3893
See application file for complete search history.

(56) References Cited

U.S. PATENT DOCUMENTS 5,991,863 A * 11/1999 Dao ...................... G06F 9/3836
                                                                 711/219
6,061,781 A *  5/2000 Jain ...................... G06F 9/3861
                                                                 708/650

(Continued)

FOREIGN PATENT DOCUMENTS

WO        2022117687 A1    6/2022

*Primary Examiner* — Jacob Petranek
(74) *Attorney, Agent, or Firm* — Adams Intellex, PLC

(57) ABSTRACT

Disclosed embodiments provide techniques for instruction execution with a processor pipeline for data transfer operations. A processor core is accessed. The processor core executes one or more instructions out of order. The processor core supports integer operations and floating-point operations. An instruction in the processor core is decoded. The instruction is a data transfer operation. The data transfer operation necessitates a floating-point operation and an integer operation. The floating-point operation and the integer operation are dispatched to one or more issue queues. The floating-point operation and the integer operation are interlocked. The interlocking is accomplished using at least one entry in the one or more issue queues. A first operation of the floating-point operation and the integer operation is executed. A second operation of the floating-point operation and the integer operation is executed. The execution of the second operation is based on the interlocking.

24 Claims, 10 Drawing Sheets

Related U.S. Application Data 23, 2024, provisional application No. 63/556,951, filed on Feb. 23, 2024, provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, provisional application No. 63/526,009, filed on Jul. 11, 2023, provisional application No. 63/521,365, filed on Jun. 16, 2023, provisional application No. 63/471,283, filed on Jun. 6, 2023, provisional application No. 63/467,335, filed on May 18, 2023, provisional application No. 63/463,371, filed on May 2, 2023, provisional application No. 63/462,542, filed on Apr. 28, 2023.

(56) References Cited

U.S. PATENT DOCUMENTS

| Patent/Pub No. | Kind | Date | Assignee/Inventor | Classification |
|---|---|---|---|---|
| 6,330,657 B1* | | 12/2001 | Col | G06F 9/28 712/217 |
| 6,519,696 B1* | | 2/2003 | Henry | G06F 9/3853 712/E9.034 |
| 6,934,809 B2 | | 8/2005 | Tremblay et al. | |
| 7,506,105 B2 | | 3/2009 | Al-Sukhni et al. | |
| 8,918,625 B1* | | 12/2014 | O'Bleness | G06F 9/3842 712/216 |
| 10,013,356 B2 | | 7/2018 | Chou | |
| 10,671,394 B2 | | 6/2020 | Britto et al. | |
| 10,929,948 B2 | | 2/2021 | Benthin et al. | |
| 11,288,405 B2 | | 3/2022 | Belgarric et al. | |
| 11,403,099 B2 | | 8/2022 | Cerny et al. | |
| 11,403,225 B2 | | 8/2022 | Zheng et al. | |
| 11,429,529 B2 | | 8/2022 | Hornung et al. | |
| 11,442,863 B2 | | 9/2022 | Shulyak et al. | |
| 11,474,130 B2 | | 10/2022 | Lentz et al. | |
| 11,486,911 B2 | | 11/2022 | Tuncer et al. | |
| 2009/0172349 A1* | | 7/2009 | Sprangle | G06F 9/30043 712/E9.021 |
| 2009/0198974 A1* | | 8/2009 | Barowski | G06F 7/57 712/222 |
| 2010/0306510 A1* | | 12/2010 | Olson | G06F 9/30032 712/218 |
| 2018/0267798 A1* | | 9/2018 | Grisenthwaite | G06F 9/3853 |
| 2022/0004639 A1 | | 1/2022 | Yardi et al. | |
| 2022/0019436 A1* | | 1/2022 | Lloyd | G06F 9/30181 |
| 2022/0029780 A1 | | 1/2022 | Dafali | |
| 2022/0197657 A1 | | 6/2022 | Soundararajan et al. | |

\* cited by examiner

PROCESSOR PIPELINE FOR INTERLOCKED DATA TRANSFER OPERATIONS WITH VARIABLE LATENCY

RELATED APPLICATIONS

This application claims the benefit of U.S. provisional patent applications "Processor Pipeline For Data Transfer Operations" Ser. No. 63/462,542, filed Apr. 28, 2023, "Out-Of-Order Unit Stride Data Prefetcher With Scoreboarding" Ser. No. 63/463,371, filed May 2, 2023, "Architectural Reduction Of Voltage And Clock Attach Windows" Ser. No. 63/467,335, filed May 18, 2023, "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, "Cache Snoop Replay Management" Ser. No. 63/605,620, filed Dec. 4, 2023, "Processing Cache Evictions In A Directory Snoop Filter With ECAM" Ser. No. 63/556,944, filed Feb. 23, 2024, "System Time Clock Synchronization On An SOC With LSB Sampling" Ser. No. 63/556,951, filed Feb. 23, 2024, "Malicious Code Detection Based On Code Profiles Generated By External Agents" Ser. No. 63/563,102, filed Mar. 8, 2024, "Processor Error Detection With Assertion Registers" Ser. No. 63/563,492, filed Mar. 11, 2024, "Starvation Avoidance In An Out-Of-Order Processor" Ser. No. 63/564,529, filed Mar. 13, 2024, and "Vector Operation Sequencing For Exception Handling" Ser. No. 63/570,281, filed Mar. 27, 2024.

Each of the foregoing applications is hereby incorporated by reference in its entirety.

FIELD OF ART

This application relates generally to processor instruction execution and more particularly to a processor pipeline for data transfer operations.

BACKGROUND

Microprocessors (processors) are integrated circuits that contain a central processing unit (CPU) and other components, such as memory and input/output interfaces. Processors are the "brain" of most computers and other electronic devices, and are responsible for executing the instructions that make up a computer program. The capabilities of microprocessors can vary widely depending on the specific model and design. However, some of the common capabilities of microprocessors include the ability to execute a large number of instructions per second. Additionally, modern microprocessors have memory management systems that can access and manipulate data stored in memory, including both RAM (random access memory) and non-volatile memory, such as flash memory or hard disk drives. Microprocessors can be equipped with a variety of I/O (input/output) interfaces that allow them to communicate with other components and devices, such as keyboards, mice, displays, and network adapters, to enable user input and connectivity. Some microprocessors are designed to perform multiple operations at the same time, using multiple cores or processors. This allows them to handle more complex tasks and to work more efficiently.

Main categories of processors include Complex Instruction Set Computer (CISC) types, and Reduced Instruction Set Computer (RISC) types. In a CISC processor, one instruction may execute several operations. The operations can include memory storage, loading from memory, arithmetic operations, and so on. In contrast, in a RISC processor, the instruction sets tend to be smaller than the instruction sets of CISC processors, and may be executed in a pipelined manner, having pipeline stages that may include fetch, decode, and execute. Each of these pipeline stages may take one clock cycle to complete, and thus, the pipelined operation can allow RISC processors to operate on more than one instruction per clock cycle.

Integrated circuits (ICs) such as processors may be designed using a Hardware Description Language (HDL). Examples of such languages can include Verilog, VHDL, etc. HDLs enable the description of behavioral, register transfer, gate, and switch level logic. This provides designers with the ability to define levels in detail. Behavioral level logic allows for a set of instructions to be executed sequentially, while register transfer level logic allows for the transfer of data between registers, driven by an explicit clock and gate level logic. The HDL can be used to create text models that describe or express logic circuits. The models can be processed by a synthesis program, followed by a simulation program to test the logic design. Part of the process may include Register Transfer Language (RTL) abstractions that define the synthesizable data that is fed into a logic synthesis tool, which in turn creates the gate-level abstraction of the design that is used for downstream implementation operations.

The capabilities of processors are constantly evolving and improving as advances in technology and design allow for more processing power, greater memory capacity, and other enhancements. As a result, microprocessors are playing an increasingly important role in a wide range of applications. These can include industrial computers, automotive applications, personal computers, wearable computers, smartphones, Internet of Things (IoT) devices, and beyond.

SUMMARY

Pipeline hazards are problems that can occur in a pipelined architecture, such as a RISC (Reduced Instruction Set Computing) processor. They arise when the pipeline encounters difficulties executing instructions in a timely and accurate manner. This can result in reduced performance or incorrect results. Hazards can cause the pipeline to stall, which means that the pipeline must wait for data to be available before continuing. This diminishes the overall processing speed of the system. There are various types of pipeline hazards that can occur in a RISC processor. Data hazards occur when two instructions in the pipeline need to access the same data. This can result in incorrect results if the instructions are executed out of order. Control hazards occur when the execution of an instruction depends on the outcome of a previous instruction. For example, if an instruction jumps to a different location in the code, the pipeline must wait for that instruction to complete before it can continue executing. Structural hazards occur when there is a conflict between the resources required by different instructions in the pipeline. For example, if two instructions need to use the same functional unit at the same time, the pipeline must wait for one of the instructions to complete before it can continue executing. Resource hazards occur when the pipeline does not have sufficient resources, such as register files or functional units, to execute all of the instructions in the pipeline. These hazards can adversely affect processor performance.

Disclosed embodiments provide techniques for instruction execution with a processor pipeline for data transfer operations. A process core is accessed. The processor core executes one or more instructions out of order. The processor core supports integer operations and floating-point operations. An instruction in the processor core is decoded. The instruction is a data transfer operation. A data transfer operation takes floating-point format data as input and outputs integer format data, or it takes integer format data and outputs floating-point data. The data transfer operation therefore requires both a floating-point operation type and an integer operation type. The floating-point operation and the integer operation are dispatched to one or more issue queues. The floating-point operation and the integer operation are interlocked. The interlocking is accomplished using at least one entry in the one or more issue queues. A first operation of the floating-point operation and the integer operation is executed. A second operation of the floating-point operation and the integer operation is executed. The execution of the second operation is based on the interlocking.

A processor-implemented method for instruction execution is disclosed comprising: accessing a processor core, wherein the processor core executes one or more instructions out of order, and wherein the processor core supports integer operations and floating-point operations; decoding an instruction in the processor core, wherein the instruction comprises a data transfer operation, and wherein the data transfer operation necessitates a floating-point operation and an integer operation; dispatching the floating-point operation and the integer operation to one or more issue queues; interlocking the floating-point operation and the integer operation, wherein the interlocking is accomplished using at least one entry in the one or more issue queues; executing a first operation of the floating-point operation and the integer operation; and executing a second operation of the floating-point operation and the integer operation, based on the interlocking. In embodiments, the one or more issue queues comprise a floating-point issue queue and an integer issue queue. In embodiments, the integer operations and the floating-point operations include various latency operations. In embodiments, a latency of the various latency operations determines one or more fields in corresponding entries of a floating-point issue queue and an integer issue queue. And in embodiments, the various latency operations include variable latency operations.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
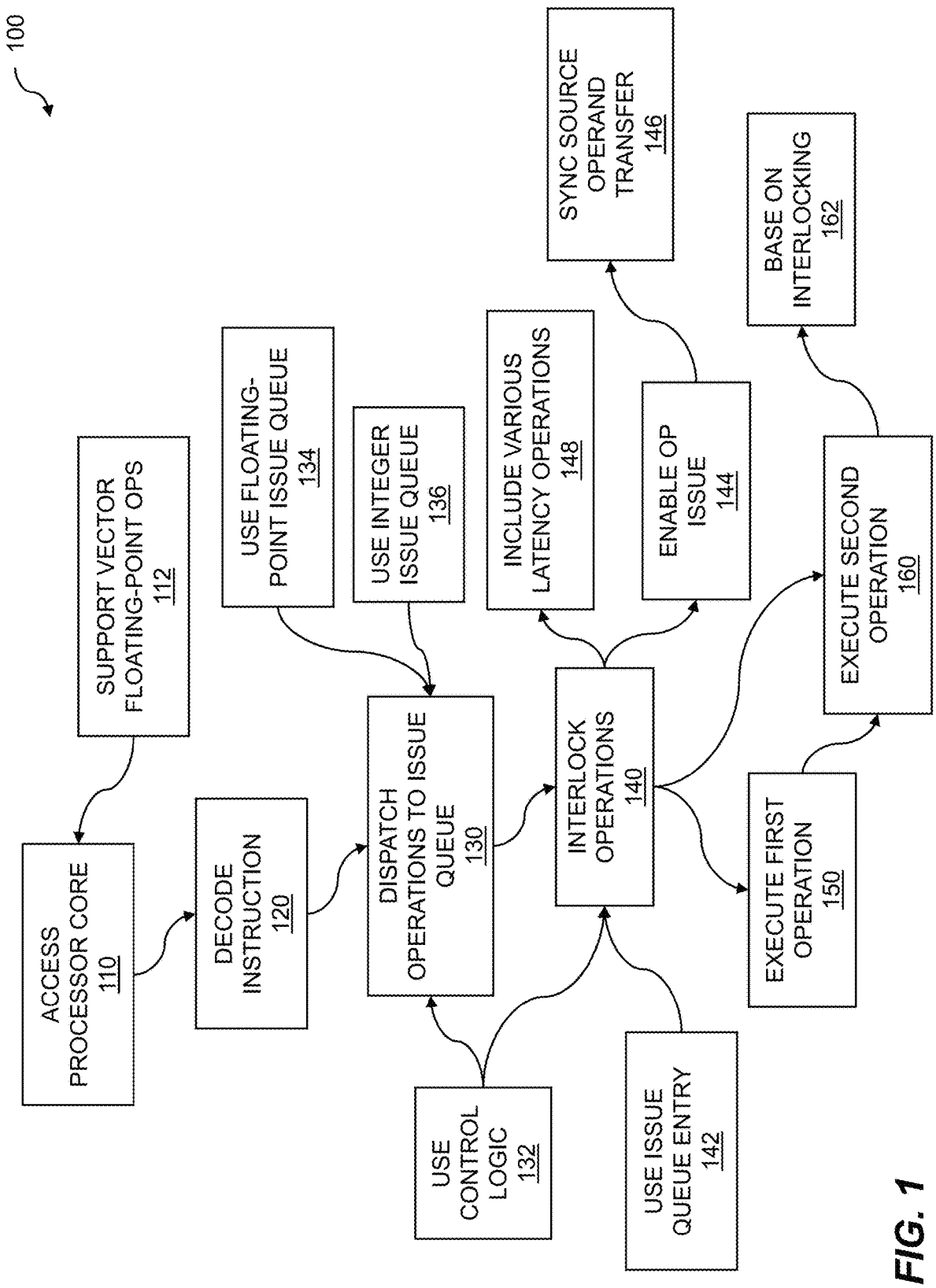
FIG. 1 is a flow diagram for a processor pipeline for data transfer operations.

Floating-point instructions and integer instructions are different types of computer instructions used for processing numbers in computer programs. Floating-point instructions are used to perform mathematical operations on numbers with a fractional part, such as 3.14 or −0.5. These instructions can handle a wide range of values and are often used for scientific and engineering applications. Integer instructions, on the other hand, are used to perform mathematical operations on whole numbers, such as 42 or −100. Integer instructions are often faster than floating-point instructions, but they can only handle a limited range of values and can result in loss of precision when working with large or small numbers.

From a processor perspective, floating-point instructions can require more clock cycles to execute than integer instructions. Thus, a processor instruction set can include instructions that require various latencies, or different amounts of clock cycles, to complete. This can create a challenge for efficient pipelining of instructions. Various latency instructions can even include variable latency instructions, where the time, or number of cycles, is not determinant, that is, depending on the operands, a result may take a different number of cycles to complete. Examples of variable latency operations can include floating-point division (FDIV) operations and floating-point square root (FSQRT) operations. Additionally, a processor instruction set can include hybrid instructions that operate on both floating-point and integer values. These can include conversion functions such as floating-point to integer (F2I) operations and integer to floating-point (I2F) operations, which can be classified as datatype transfer operations, or simply data transfer operations. Such data transfer operations can be called hybrid operations, because both a floating-point operation and an integer operation are required to successfully execute the parent instruction set architecture (ISA) instruction.

There are various considerations that warrant conversion between integer and floating-point numbers. One consideration is accuracy. Floating-point numbers provide more precision than integers and are useful for applications that require high accuracy, such as scientific simulations or financial calculations. However, floating-point numbers take up more space in memory and are slower to process than integers, so it may be necessary to convert to integers for efficiency. Another consideration is input/output (I/O) restrictions. Some systems may receive input or produce output in one format, but may need to perform calculations in the other format. For example, a system may receive an input as an integer and need to convert it to a floating-point number for processing, and then convert back to an integer for output. Another factor is performance. Converting between integer and floating-point numbers can help to optimize code by reducing the number of operations required to perform a task or by improving the speed and efficiency of calculations.

Techniques for instruction execution with a processor pipeline for data transfer operations are disclosed. Instructions are divided into two or more operations. The operations can be hybrid operations. The hybrid operations can include pairs of operations, one of which operates on floating-point values and the other of which operates on integer values. The ISA instructions that necessitate hybrid operations, also herein called data transfer operations, can include data conversion instructions, data movement instructions, data compare operations, data classification operations, and so on. The floating-point data involved can be 64 bits, 32 bits, or some other suitable length. Similarly, the integer data involved can be 32 bits, 64 bits, or another suitable length. The length of the input data can be different from the length of the output data, in addition to being a different type of data (i.e., floating-point vs. integer). For example, the RISC-V™ ISA includes single-precision floating-point conversion and move instructions such as FCVT.W.S and FCVT.L.S for converting a floating-point number to a signed 32-bit or 64-bit integer; FCVT.S.W and FCVT.S.L for converting a 32-bit or 64-bit signed integer into a floating-point number; FCVT.WU.S, FCVT.LU.S, FCVT.S.WU, and FCVT.S.LU for converting to or from unsigned integer values; FMV.X.W for moving a single-precision floating-point value to the lower 32 bits of an integer register; FMV.W.X for moving a single-precision value from the lower 32 bits of an integer register to a floating-point register; FCVT.W.D and FCVT.L.D for converting a double-precision floating-point number to a signed 32-bit or 64-bit integer; FCVT.D.W and FCVT.D.L for converting a 32-bit or 64-bit signed integer into a double-precision floating-point number in a floating-point register; FCVT.WU.D, FCVT.LU.D, FCVT.D.WU, and FCVT.D.LU for converting to or from unsigned integer values; FMV.X.D for moving a double-precision value in a floating-point register to a representation in IEEE 754-2008 standard encoding in an integer register; FMV.D.X for moving a double-precision value encoded in IEEE 754-2008 standard encoding from an integer register to a floating-point register; FEQ.S, FLT.S, FLE.S, FEQ.D, FLT.D, and FLE.D for comparing floating-point registers and writing "1" to an integer register if the condition holds, and "0" otherwise; and FCLASS.S and FCLASS.D for examining a value in a floating-point register writing to an integer register a 10-bit mask that indicates the class of the floating-point number.

FIG. 1 is a flow diagram 100 of a processor pipeline for data transfer operations. The flow includes accessing a processor core 110. The processor core can be a Reduced Instruction Set Computer (RISC) core. The processor core may support instructions that can be executed in a pipelined manner, with pipeline stages which may include fetch, decode, execute, etc. Each of these pipeline stages may take one or more clock cycles. In embodiments, the processor core can include a RISC-V™ processor or other suitable RISC processor type. The processor core can execute one or more instructions out of order. Out-of-order execution can increase overall processor performance, but it can also introduce hazards into processor execution, such as an instruction's source operands being dependent on the result of an older instruction. Hazards can exist in any processor, whether an in-order execution architecture or an out-of-order (OOO) execution architecture. Increasing performance by executing OOO, however, requires mechanisms to be added to reduce the stalls that hazards cause, otherwise OOO performance gains may be eroded; disclosed concepts address such mechanisms. The processor core can include facilities to support operating on both integer data types and floating-point data types, using integer operations and floating-point operations, respectively. Disclosed techniques enable the processor core to process instructions that may be out of order and involve operations for both integers and floating-point numbers, some of which were described above. The processor core can support vector floating-point operations 112, which are enabled through techniques disclosed herein. However, for clarity, scalar floating-point operations are used as an exemplar in disclosed techniques. In embodiments, the one or more instructions include vector floating-point instructions.

The flow 100 includes decoding an instruction 120 in the processor core. The instruction can comprise a data transfer operation (DTO). A data transfer operation can require transferring data within the processor core between floating-point facilities, such as a floating-point unit (FPU), and integer facilities, such as an arithmetic logic unit (ALU). Thus, a DTO can necessitate execution of both a floating-point operation and an integer operation. The flow 100 can include dispatching the decoded instruction (which is a DTO) as two operations to one or more issue queues 130. The one or more issue queues can comprise a floating-point issue queue 134 and an integer issue queue 136. The issue queue(s) can be written with various information dispatched by control logic 132 in the processor core to enable out-of-order instructions (global construct) and/or operations (local construct) to complete in a timely, successful, and hazard-free manner. For example, if the decoded instruction is a floating-point convert instruction, the control logic can dispatch a floating-point operation, which performs an operation on a floating-point number, and an integer operation, which stores the result in an integer register or register file. The control logic can comprise a processor core decode unit.

The flow 100 includes interlocking the operations 140. Discussed throughout, the exemplary instruction is decoded into two operations comprising a floating-point operation and an integer operation, although more than two resulting operations are possible. The interlocking can also be managed by using control logic 132. In embodiments, the interlocking is managed by a decode unit. The interlocking can be required to resolve both global instruction hazards, which are necessitated by out-of-order execution of instructions, and local operation hazards, which are necessitated by data transfer operations. The interlocking can be enabled by using one or more issue queue entries 142. For example, a DTO that is dispatched to a floating-point issue queue and an integer issue queue can require an entry in each of the floating-point issue queue and the integer issue queue. The interlocking can enable each issue queue to issue its operation 144 at the proper time and in the proper sequence to the proper resource. The enabling each issue queue to issue its operation can also enable synchronization of the operand transfer 146 between the first operation of the DTO and the second operation of the DTO.

Various fields can comprise issue queue entries. In embodiments, at least one entry in the one or more issue queues includes one or more of a companion instruction queue identification, a dependency bit, and an operation type. The companion instruction queue identification can indicate a linked pair of issue queues used to enable execution of the DTO. The dependency bit can indicate on which entry in a linked issue queue the dependency bit entry is dependent. The operation type can identify the actual operation to be executed by the issue queue entry. In embodiments, the companion instruction queue identification, the dependency bit, and/or the operation type enable the interlocking at an instruction level, i.e., a DTO-type instruction that requires hazard removal due to linked floating-point/integer processing. In embodiments, the at least one entry in the one or more issue queues includes a reorder buffer identification and/or an operand validity indication. The reorder buffer identification can indicate to which location within the reorder buffer an issue queue entry refers. The operand validity indication can indicate when an operand used in an issue queue entry becomes valid for downstream consumption. In embodiments, the reorder buffer identification and/or the operand validity indication enable interlocking at an out-of-order instruction level, i.e., multiple instructions that require hazard removal due to out-of-order processing.

The interlocking operations 140 can include interlocking various latency operations 148. Because certain processor core operations can complete in x cycles and other operations can complete in y cycles, where x is different from y, the interlocking must prevent premature execution and enable hazard removal for the instructions that generate those operations. Other processor core operations can actually complete in an indeterminant number of cycles, which further necessitates preventing premature execution and enabling hazard removal. Examples of such operations can be floating-point divide operations and floating-point square root operations. Such variable latency operations can have dedicated logic units within the processor core and can employ a request/grant protocol for signaling when the variable latency operation completes and its resulting output operand is available. In embodiments, the integer operations and the floating-point operations include various latency operations. In embodiments, a latency of the various latency operations determines one or more fields in the corresponding entries in the floating-point issue queue and in the integer issue queue. In embodiments, the various latency operations include variable latency operations. And in embodiments, a request/grant protocol is employed for interlocking variable latency operations.

The flow 100 can include executing the first operation 150 of the DTO. The first operation can be a floating-point operation or an integer operation. The flow 100 can include executing the second operation 160 of the DTO. The second operation can be a floating-point operation or an integer operation, but would typically be the operation type not represented by the first operation. Execution of the second operation is based on, or controlled by, the interlocking 162. The interlocking enables issuing an operation from an instruction queue to an execution unit at the proper, hazard-free time. The interlocking enables a source operation for the second operation to be obtained from the first operation.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
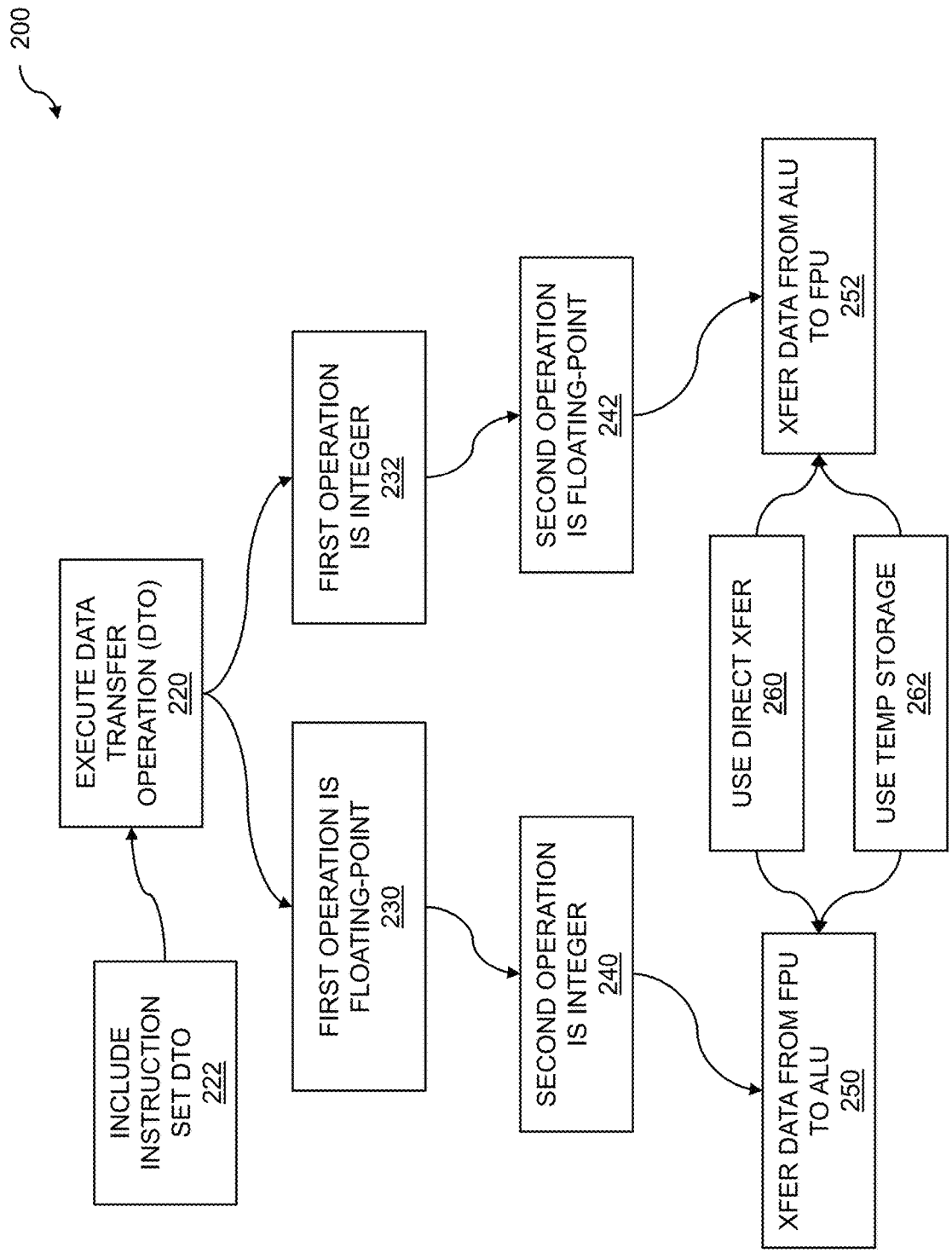
FIG. 2 is a diagram illustrating data transfer operation management.

FIG. 2 is a diagram illustrating data transfer operation management. Data transfer operation management can enable a processor pipeline for data transfer operations. The diagram 200 includes executing a data transfer operation (DTO) 220. Recall that a DTO can result from an instruction that requires both floating-point and integer processing and/or operands. Various instruction set architectures (ISAs) can include an instruction set-based DTO 222, as described earlier. In embodiments, the data transfer operations include floating-point convert operations, floating-point move operations, floating-point compare operations, and floating-point class operations. In embodiments, the data transfer operations include single-precision floating-point operations and double-precision floating-point operations. The diagram 200 includes the case where the first operation to be executed is a floating-point operation 230. This case involves an initial, or starting, operand that is represented as a floating-point data type. When the first operation is a floating-point operation, the second operation to be executed can be an integer operation 240. The floating-point operation can be executed in a floating-point unit (FPU), which can be general purpose or dedicated to a particular floating-point operation, such as division. As the floating-point operation reaches a point at which its output operand is calculated, the operand data can be transferred from the FPU to a linked arithmetic logic unit (ALU) for completion of the integer operation. Recall that a floating-point issue queue and an integer issue queue can be linked for purposes of DTO execution; the respective FPU and ALU that do the executing can therefore be considered "linked" in the same manner.

The diagram 200 includes the case where the first operation to be executed is an integer operation 232. This case involves an initial, or starting, operand that is represented as an integer data type. When the first operation is an integer operation, the second operation to be executed can be a floating-point operation 242. The integer operation can be executed in an ALU. As the integer operation reaches a point at which its output operand is calculated, the operand data can be transferred from the ALU to a linked FPU for completion of the floating-point operation. Recall that a floating-point issue queue and an integer issue queue can be linked for purposes of DTO execution; the respective FPU and ALU that do the executing can therefore be considered "linked" in the same manner.

The data transfer from the FPU to the ALU 250 and the data transfer from the ALU to the FPU 252 can be accomplished by a direct operand transfer 260, using a unique communication channel between the linked units. This completely avoids having to write back the output from the first execution unit (either FPU or ALU) to a register or register file in order to provide the output operand as an input to the second execution unit (either ALU or FPU, respectively). Alternatively, instead of direct operand transfer, the transfer can use a small, temporary storage facility 262 which is available only locally for DTO operand shuttling. Thus, sometimes the first operation comprises a floating-point operation and the second operation comprises an integer operation, the first operation is executed in a floating-point unit and the second operation is executed in an arithmetic logic unit, and data resulting from the first operation is transferred directly from the floating-point unit to the arithmetic logic unit. In embodiments, the data resulting from the first operation is transferred from the floating-point unit to the arithmetic logic unit using temporary register or register file storage. Other times, the first operation comprises an integer operation and the second operation comprises a floating-point element operation, the first operation is executed in an arithmetic logic unit and the second operation is executed in a floating-point unit, and data resulting from the first operation is transferred directly from the arithmetic logic unit to the floating-point unit. In embodiments, the data resulting from the first operation is transferred from the arithmetic logic unit to the floating-point unit using temporary register or register file storage.

Figure 3:
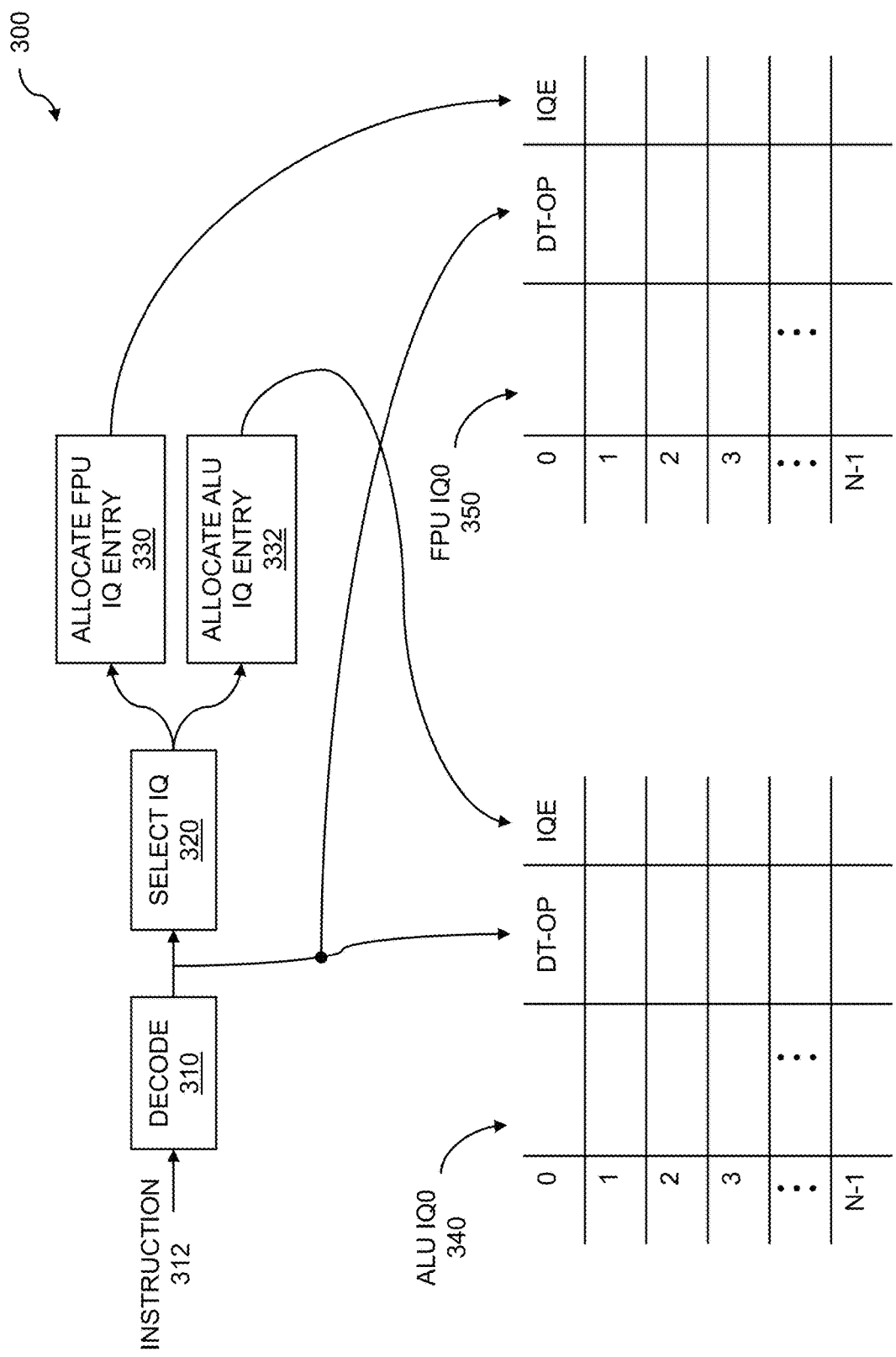
FIG. 3 illustrates data transfer operation (DTO) instruction decode and issue.

FIG. 3 illustrates data transfer operation (DTO) instruction decode and issue. DTO instruction decode and issue can enable a processor pipeline for data transfer operations. In the illustration 300, an instruction 312 is received by a processor core. The instruction includes floating-point operands and integer operands, and is therefore decoded 310 into two or more operations, at least one of which is a floating-point operation and one of which is an integer operation. The decoded instruction operations are then selected for dispatch to one or more issue queues 320. The issue queue can be implemented as a unified issue queue containing both floating-point operations and integer operations, or it can be implemented as a separate floating-point issue queue and an integer issue queue, which is discussed herein as an exemplar. In the exemplary case, an entry is allocated in each issue queue: in the floating-point unit (FPU) issue queue 330 for the floating-point operation and in the arithmetic logic unit (ALU) issue queue 332 for the integer operation.

Figure 4:
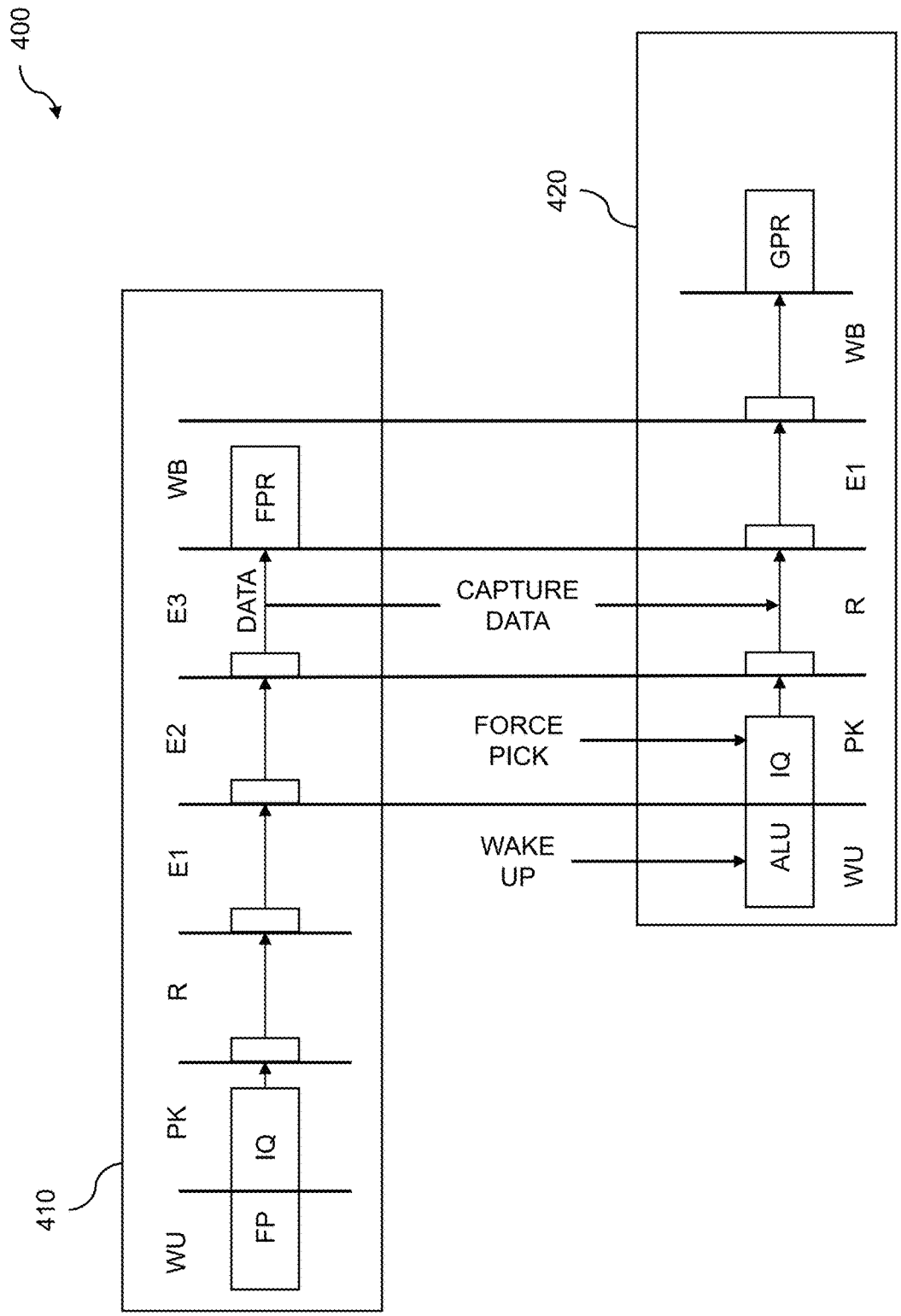
FIG. 4 illustrates a floating-point to integer (F2I) operation pipeline.

The illustration 300 shows an exemplary linked pair of issue queues, ALU IQ0 340 and FPU IQ0 350. The DTO derivative operations are shown being placed in the issue queues as a DT-OP field. Some issue queue fields are required for enabling general instructions that are out of order. Disclosed fields, as previously discussed, can also include entries unique to enabling a hazard-free DTO, and are shown as being placed in an IQE field. The DTO-unique entries enable efficient execution of DTO operations by synchronizing operation start with operand availability, which is discussed in more detail later. The entries in pairs of issue queues include dependencies between them, where the issue control logic for the operation that is to execute first holds the issue queue entry of the second operation, and where the issue control logic for the operation that is to execute second holds a dependency bit that when set, prevents the issue control logic from selecting that operation from issuing FIG. 4 illustrates a floating-point to integer (F2I) operation pipeline. In the illustration 400, a hybrid operation pipeline pair is shown. The hybrid operation pipeline (i.e., a floating-point operation pipeline linked to an integer operation pipeline, which together implement an instruction requiring a data transfer operation) enables a processor pipeline for data transfer operations. The illustration 400 shows the timing and interrelationship of execution steps for the floating-point pipeline 410 and the integer pipeline 420. Vertical line segments separate operation pipeline stages as the stages progress from left to right. Note that the illustrated pipeline pair is a mixed, logical representation illustration of hardware, timing, sequence, and interdependence, which are all conceptually related. Such hardware includes floating-point issue queue and associated control logic (FP IQ), integer issue queue and associated control logic (ALU IQ), floating-point register files (FPR), and general-purpose register files (GPR).

In floating-point pipeline 410, control logic in the issue queue determines that a first operation of a data transfer operation that was dispatched to an issue queue pair is ready for execution and "wakes up" (WU) the issue queue to initiate execution of the floating-point operation. While perhaps not technically a pipeline stage, the WU describes a function that is evaluated every cycle for every operation in an IQ. Using the latency information for the operations in an IQ, when an operation is issued, an IQ tracks when that operation will have a result available. It uses this information to update the dependency vectors for pending operations in the IQs. When all dependencies are met, then the operation is marked as ready (or eligible) for issue. This is "wake-up". It does not mean that the operation will be picked in the following clock, but that it is ready or eligible to be picked for issue, discussed further below. In addition, the WU can cause hardware structures to exit a low-power mode, wake from a sleep mode, ungate gated clocks, and so on. The WU can be predicated on general out-of-order operating principles, such as execution unit availability, input operand availability, downstream resource availability, no interrupts being present, no structural hazards being detected, etc.

In the floating-point pipeline 410, the operation contained in the floating-point issue queue is then "picked" (PK) so that it can be issued to the appropriate floating-point execution unit (FPU). Often, an IQ picks the oldest, ready operation, where oldest is based on when the operation was written into the IQ. Once an operation is eligible for issue, the IQ picks one operation to issue to an execution unit, from the set of operations eligible to execute. An operation can be kept from being selected for issue if any of its input, or source, operands are produced by an older operation that has not yet executed. For example, a dependency vector can be maintained for each IQ entry. The collection of dependency vectors across all IQs creates a two-dimensional dependency matrix. The dependency vector for an operation in an IQ can identify which IQ entry provides its source operand(s), and whether an operand is available. When all operands for an operation are available, then an operation is eligible for issue. In addition, an operation's latency can be used by the IQ to know when an operation's result is ready for a dependent operation for updating the dependency vector. Once an operation is picked, the IQ issues the operation to the FPU and reads (R) the source, or input, operand or operands from the designated operand input resource, typically a floating-point register file, so that the operand(s) are available at the FPU.

The floating-point pipeline 410 continues with three execution cycles, E1, E2, and E3, which are required to execute the illustrated floating-point operation by the FPU. Other execution cycle latencies are possible, including one cycle, two cycles, and even an indeterminant number of cycles for special operations such as a floating-point divide. During the third execution cycle E3, result data from the floating-point operation is available. A final pipeline stage is a writeback (WB) of the result operand to the floating-point output operand resource, typically a floating-point register file. This final stage can be suppressed in situations where there is no additional requirement for the output operand.

During execution of the floating-point pipeline, a companion data transfer operation integer pipeline 420 awaits operation commencement. Because the control logic "understands" that the floating-point operation in floating-point pipeline 410 is a three-cycle operation, it issues a "wake up" (WU) to the integer issue queue such that the integer arithmetic logic unit (ALU) that will be executing the "second half" of the data transfer operation receives data at the earliest point possible. This reduces latency and improves performance, which in the illustration 400, corresponds to stage E3 in floating-point pipeline 410. The control logic then forces the PK of the integer issue queue integer operation and activates the ALU paired with the aforementioned DTO FPU. The forced PK enables the read (R) of the integer operation's input operand, which is the result data from the DTO companion floating-point operation. As discussed, the data capture by the ALU of the FPU data is enabled by a local bus dedicated to the DTO execution unit pair (FPU/ALU). Alternatively, the data capture can be enabled by a small, local temporary storage resource, such as an unarchitected register or register file. Integer pipeline 420 continues with a single execution stage E1 and a WB cycle to an integer output operand resource, typically a general-purpose register or register file (GPR). In summary, the floating-point operation is written into its FP IQ with a field to identify the ALU IQ entry of the ALU operation that is paired with it. The integer (or ALU) operation pair is written into its ALU IQ with a F2I dependency bit set to identify that it is dependent with a floating-point operation. Then, as shown in the illustration 400, when the floating-point operation is in E1, the ALU IQ entry value is used to clear its F2I dependency bit and to force the pick.

Figure 5:
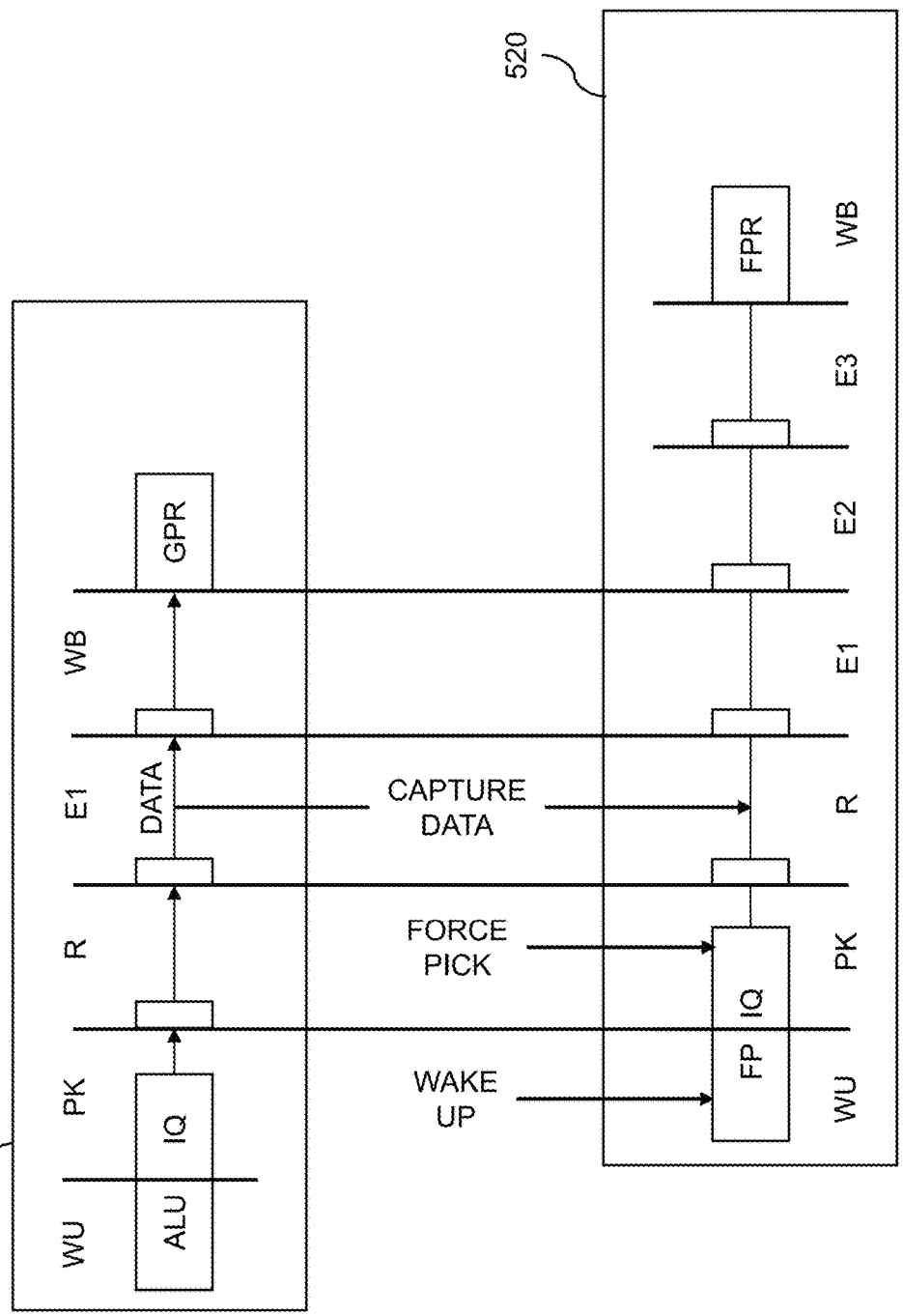
FIG. 5 illustrates an integer to floating-point (I2F) operation pipeline.

FIG. 5 illustrates an integer to floating-point (I2F) operation pipeline. In the illustration 500, a hybrid operation pipeline pair is shown. The hybrid operation pipeline (i.e., an integer operation pipeline linked to a floating-point operation pipeline, which together implement an instruction requiring a data transfer operation) enables a processor pipeline for data transfer operations. The illustration 500 shows the timing and interrelationship of execution steps for the integer pipeline 510 and the floating-point pipeline 520. Vertical line segments separate operand execution steps on a cycle-by-cycle basis moving from left to right. Note that the illustrated pipeline pair is a mixed, logical representation illustration of hardware, timing, sequence, and interdependence, which are all conceptually related. Such hardware includes floating-point issue queue and associated control logic (FP IQ), integer issue queue and associated control logic (ALU IQ), floating-point register files (FPR), and general-purpose register files (GPR).

In the integer pipeline 510, issue queue control logic determines that a data transfer operation dispatched to an issue queue pair is ready for execution and "wakes up" (WU) the issue queue to commence execution of the integer operation. While perhaps not technically a pipeline stage, the WU describes a function that is evaluated every cycle for every operation in an IQ. Using the latency information for the operations in an IQ, when an operation is issued, an IQ tracks when that operation will have a result available. It uses this information to update the dependency vectors for pending operations in the IQs. When all dependencies are met, the operation is marked as ready (or eligible) for issue. This is "wake-up". It does not mean that the operation will be picked in the following clock, but that it is ready or eligible to be picked for issue, discussed further below. The WU can be predicated on general out-of-order operating principles, such as execution unit availability, input operand availability, downstream resource availability, no interrupts being present, no structural hazards being detected, etc. The WU can cause hardware structures to exit a low-power mode, wake from a sleep mode, ungate gated clocks, and so on. The WU can be predicated on specific interlocking dependencies for executing data transfer operations in a hazard-free manner.

In the integer pipeline 510, the operation contained in the integer (ALU) issue queue is then "picked" (PK) so that it can be issued to the appropriate arithmetic logic execution unit (ALU). Often, an IQ picks the oldest ready operation, where oldest is based on when the operation was written into the IQ. Once an operation is eligible for issue, the IQ picks one operation to issue to an execution unit from the set of operations eligible to execute. An operation can be kept from being selected for issue if any of its input, or source, operands are produced by an older operation that has not yet executed. For example, a dependency vector can be maintained for each IQ entry. The collection of dependency vectors across all IQs creates a two-dimensional dependency matrix. The dependency vector for an operation in an IQ can identify which IQ entry provides its source operand(s), and whether an operand is available. When all operands for an operation are available, then an operation is eligible for issue. In addition, an operation's latency can be used by the IQ to know when an operation's result is ready for a dependent operation for updating the dependency vector. Once an operation is picked, the IQ issues the operation to the ALU and reads (R) the source, or input, operand or operands from the designated operand input resource, typically a general-purpose register file, so that the operand(s) are available at the ALU.

The integer pipeline 510 continues with a single execution cycle, E1, that is required to execute the illustrated integer operation. Other execution cycle latencies are possible, including two cycles, three cycles, etc. During the execution cycle E1, result, or output, data from the integer operation is available. A final pipeline stage is a writeback (WB) of the result operand to the integer output operand resource, typically a general-purpose register file (GPR). This final stage can be suppressed in situations where there is no additional requirement for the output operand.

During execution of the integer pipeline, a companion data transfer operation floating-point pipeline 520 awaits operation commencement. Because the control logic "understands" that the integer operation in integer pipeline 510 is a one-cycle operation, it issues a WU to the floating-point issue queue such that the floating-point unit (FPU) that will be executing the "second half" of the data transfer operation receives data at the earliest point possible. This reduces latency and improves performance, which, in the illustration 500, corresponds to stage E1 in integer pipeline 510. The control logic then forces the read of the floating-point issue queue floating-point operation and activates the FPU paired with the aforementioned DTO ALU. The forced PK results in the read of the floating-point operation's input operand, which is the result data from the DTO companion integer operation. As discussed, the data capture by the FPU of the ALU data is enabled by a local bus dedicated to the DTO execution unit pair (FPU/ALU). Alternatively, the data capture can be enabled by a small, local temporary storage resource, such as an unarchitected register or register file. Floating-point pipeline 520 continues with three execution stages, E1, E2, and E3, and a WB cycle to a floating-point output operand resource, typically a floating-point register or register file (FPR).

Figure 6:
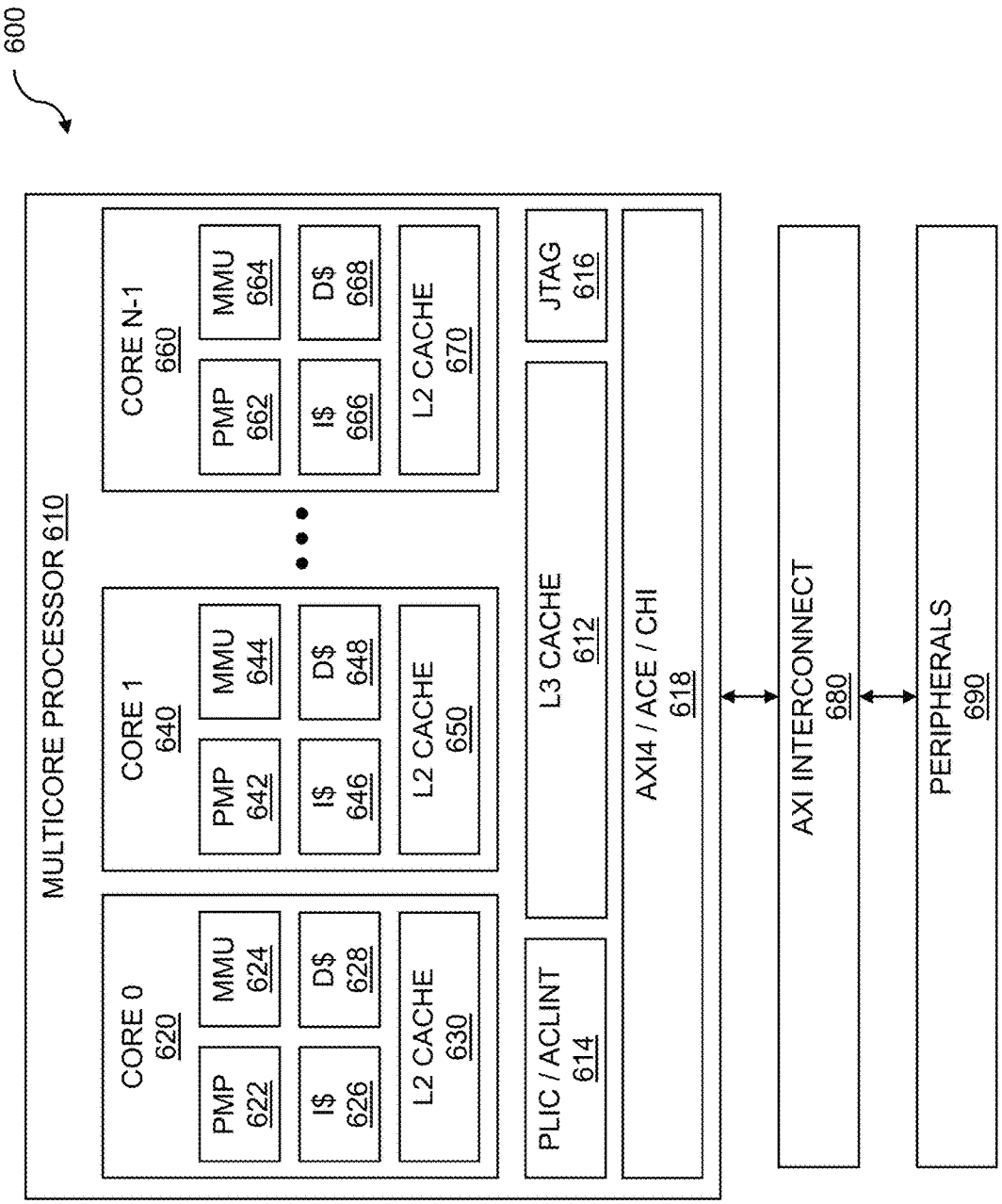
FIG. 6 is a block diagram illustrating a RISC-V processor.

FIG. 6 is a block diagram illustrating a RISC-V™ processor. The processor can include a multi-core processor, where two or more processor cores can be associated with the processor. The processor can be used to implement a processor pipeline for data transfer operations. The processor, such as a RISC-V™ processor, can include a variety of elements. The elements can include processor cores, one or more caches, memory protection and management units, local storage, and so on. The elements of the multicore processor can further include one or more of a private cache, a test interface such as a Joint Test Action Group (JTAG) test interface, one or more interfaces to a network such as a network-on-chip, shared memory, peripherals, and the like. Processing by the multicore processor is enabled by processor request arbitration based on access request dynamic multilevel arbitration. A plurality of processor cores is accessed. The plurality of processor cores is coupled to a memory subsystem. A plurality of access requests is generated, within the plurality of processor cores coupled to the memory subsystem, by the plurality of processor cores. A set of at least two criteria is associated to each access request in the plurality of access requests. The criteria are dynamically assigned. The requests are organized in two vectors and a stack. The request is granted, based on data in the two vectors and the stack.

The block diagram 600 can include a multicore processor 610. The multicore processor can comprise two or more processors, where the two or more processors can include homogeneous processors, heterogeneous processors, etc. In the block diagram, the multicore processor can include N processor cores such as core 0 620, core 1 640, core N−1 660, and so on. Each processor can comprise one or more elements. In embodiments, each core, including cores 0 through core N−1 can include a physical memory protection (PMP) element, such as PMP 622 for core 0; PMP 642 for core 1, and PMP 662 for core N−1. In a processor architecture such as the RISC-V™ architecture, a PMP can enable processor firmware to specify one or more regions of physical memory such as cache memory of the shared memory, and to control permissions to access the regions of physical memory. The cores can include a memory management unit (MMU) such as MMU 624 for core 0, MMU 644 for core 1, and MMU 664 for core N−1. The memory management units can translate virtual addresses used by software running on the cores to physical memory addresses with caches, the shared memory system, etc.

The processor cores associated with the multicore processor 610 can include caches such as instruction caches and data caches. The caches, which can comprise level 1 (L1) caches, can include an amount of storage such as 16 KB, 32 KB, and so on. The caches can include an instruction cache I$ 626 and a data cache D$ 628 associated with core 0; an instruction cache I$ 646 and a data cache D$ 648 associated with core 1; and an instruction cache I$ 666 and a data cache D$ 668 associated with core N−1. In addition to the level 1 instruction and data caches, each core can include a level 2 (L2) cache. The level 2 caches can include L2 cache 630 associated with core 0; L2 cache 650 associated with core 1; and L2 cache 670 associated with core N−1. The cores associated with the multicore processor 610 can include further components or elements. The further elements can include a level 3 (L3) cache 612. The level 3 cache, which can be larger than the level 1 instruction and data caches, and the level 2 caches associated with each core, can be shared among all of the cores. The further elements can be shared among the cores. In embodiments, the further elements can include a platform level interrupt controller (PLIC) 614. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 616. The JTAG can provide a boundary within the cores of the multicore processor. The JTAG can enable fault information to a high precision. The high-precision fault information can be critical to rapid fault detection and repair.

The multicore processor 610 can include one or more interface elements 618. The interface elements can support standard processor interfaces such as an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. In the block diagram 600, the interface elements can be coupled to the interconnect. The interconnect can include a bus, a network, and so on. The interconnect can include an AXI™ interconnect 680. In embodiments, the network can include network-on-chip functionality. The AXI™ interconnect can be used to connect memory-mapped "master" or boss devices to one or more "slave" or worker devices. In the block diagram 600, the AXI interconnect can provide connectivity between the multicore processor 610 and one or more peripherals 690. The one or more peripherals can include storage devices, networking devices, and so on. The peripherals can enable communication using the AXI™ interconnect by supporting standards such as AMBA™ version 4, among other standards.

Figure 7:
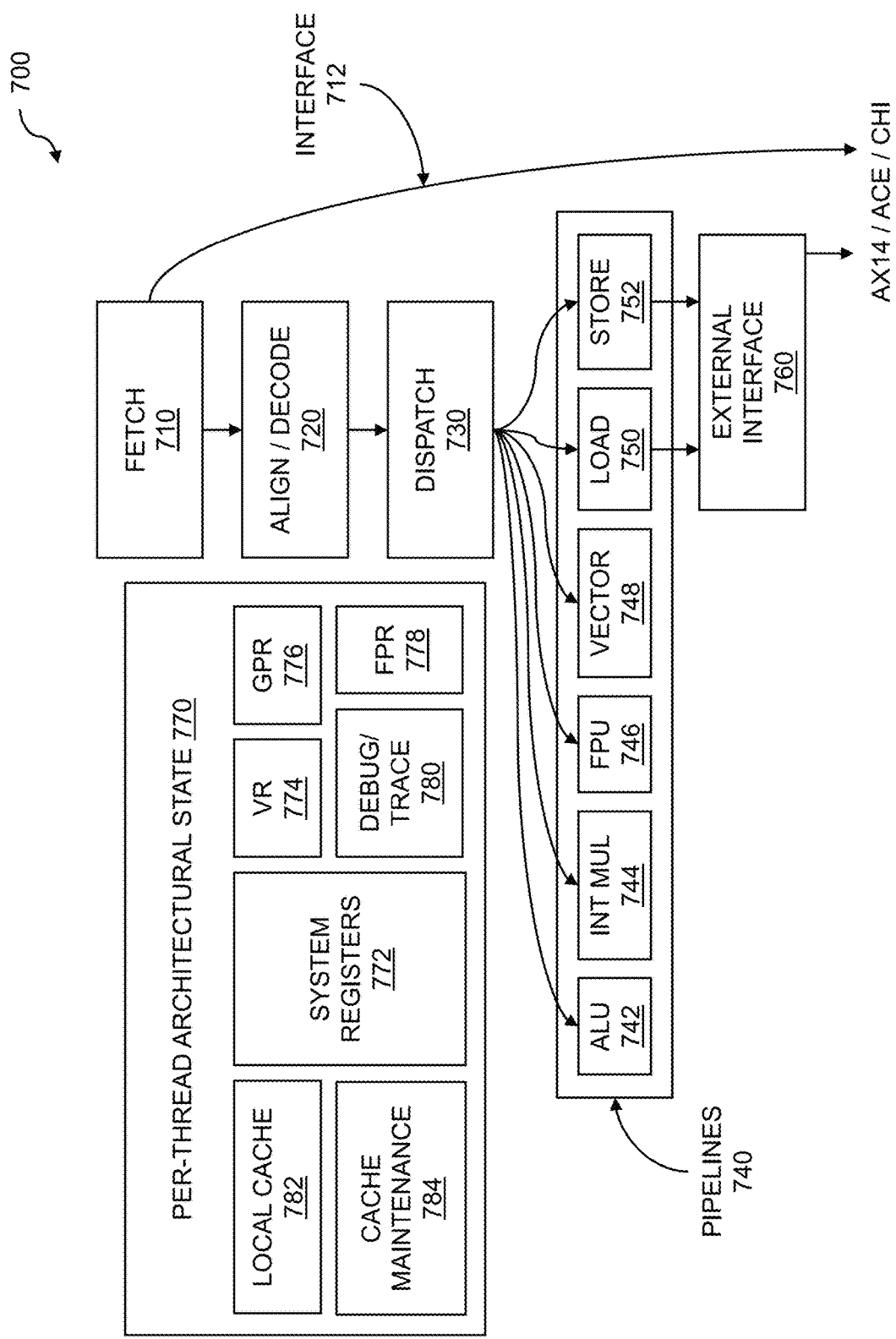
FIG. 7 illustrates a block diagram for a pipeline.

FIG. 7 illustrates a block diagram for a pipeline. The use of one or more pipelines associated with a processor architecture can greatly enhance processing throughput. The processor architecture can be associated with one or more processor cores. The processing throughput can be increased by execution of multiple operations in parallel. The use of one or more pipelines supports coherency management, where the coherency management is enabled by access request dynamic multilevel arbitration. A pipeline can be used to implement a processor pipeline for data transfer operations. A plurality of processor cores is accessed. The plurality of processor cores is coupled to a memory subsystem. A plurality of access requests is generated, within the plurality of processor cores coupled to the memory subsystem, by the plurality of processor cores. A set of at least two criteria is associated to each access request in the plurality of access requests. The criteria are dynamically assigned. The requests are organized in two vectors and a stack. The request is granted, based on data in the two vectors and the stack. The vectors are organized as linear vectors. The stack is organized as a push-pop stack.

The FIG. 700 shows a block diagram of a pipeline such as a processor core pipeline. The blocks within the block diagram can be configurable in order to provide varying processing levels. The varying processing levels can be based on processing speed, bit lengths, and so on. The block diagram 700 can include a fetch block 710. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 712. The interface can include a standard interface such as one or more industry standard interfaces. The interfaces can include an Advanced eXtensible Interface (AXI™), an ARM™ Advanced eXtensible Interface (AXI™) Coherence Extensions (ACE™) interface, an Advanced Microcontroller Bus Architecture (AMBA™) Coherence Hub Interface (CHI™), etc.

The block diagram 700 includes an align and decode block 720. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The system block diagram 700 can include a dispatch block 730. The dispatch block can receive decoded instruction packets from the align and decode block. The decoded instruction packets can be used to control a pipeline 740, where the pipeline can include an in-order pipeline, an out-of-order (OoO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 742, integer multiplier pipelines 744, floating-point unit (FPU) pipelines 746, vector unit (VU) pipelines 748, and so on. The dispatch unit can further dispatch instructions to pipelines that can include load pipelines 750, and store pipelines 752. The load pipelines and the store pipelines can access storage such as the common memory using an external interface 760. The external interface can be based on one or more interface standards such as the Advanced eXtensible Interface (AXI™). Following execution of the instructions, further instructions can update the register state. Other operations can be performed based on actions that can be associated with a particular architecture. The actions that can be performed can include executing instructions to update the system register state, to trigger one or more exceptions, and so on In embodiments, the plurality of processors can be configured to support multi-threading. The system block diagram can include a per-thread architectural state block 770. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, a retire component (not shown) can also include thread selection logic. The per-thread architectural state can include system registers 772. The system registers can be associated with individual processors, a system comprising multiple processors, and so on. The system registers can include exception and interrupt components, counters, etc. The per-thread architectural state can include further registers such as vector registers (VR) 774, general purpose registers (GPR) 776, and floating-point registers 778. These registers can be used for vector operations, general purpose (e.g., integer) operations, and floating-point operations, respectively. The per-thread architectural state can include a debug and trace block 780. The debug and trace block can enable debug and trace operations to support code development, troubleshooting, and so on. In embodiments, an external debugger can communicate with a processor through a debugging interface such as a joint test action group (JTAG) interface. The per-thread architectural state can include a local cache state 782. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 784. The cache maintenance state can include maintenance needed, maintenance pending, maintenance complete states, etc.

Figure 8:
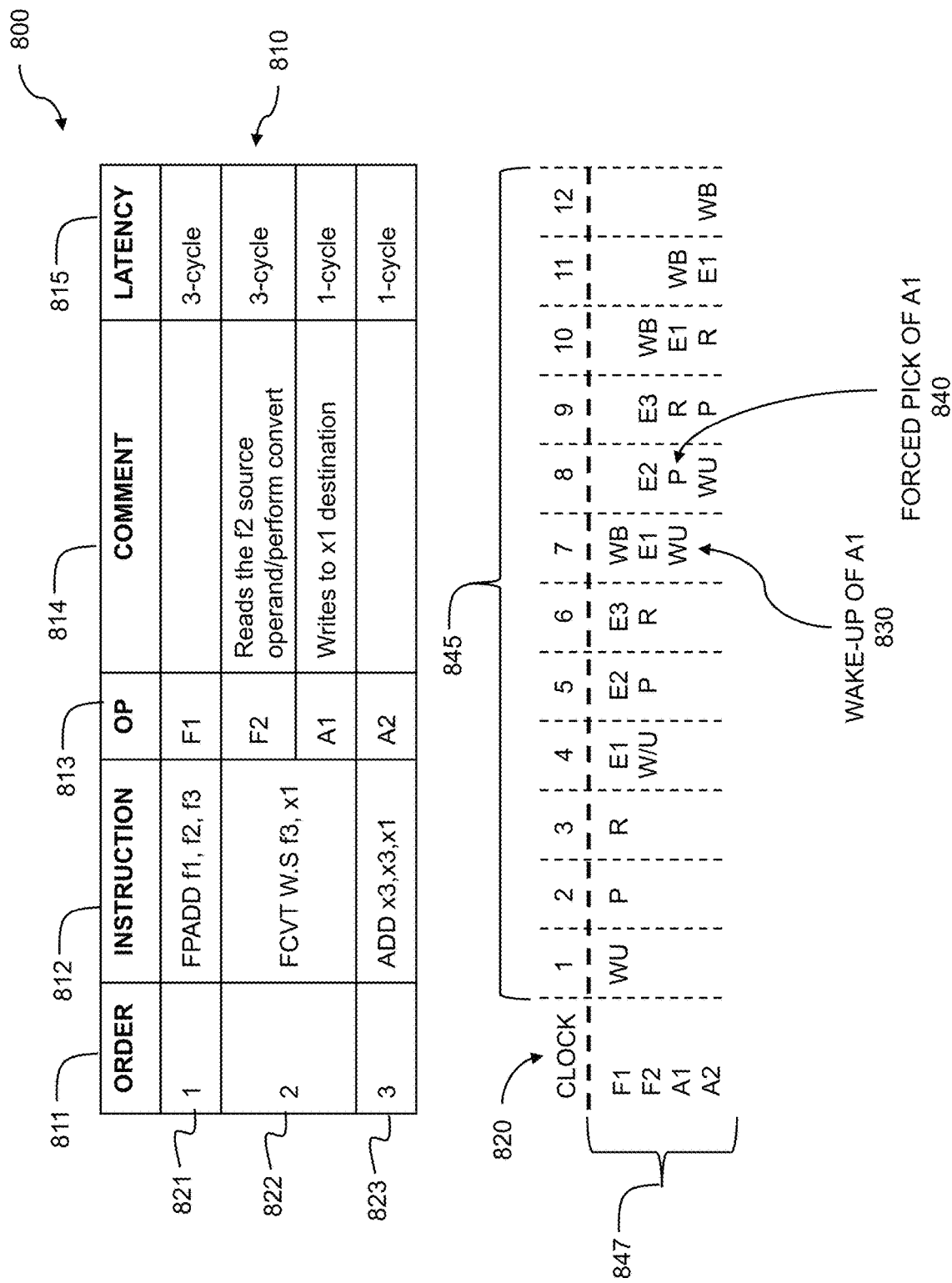
FIG. 8 shows an example F2I timing diagram and associated instruction table.

FIG. 8 shows an example F2I (floating-point to integer) timing diagram and associated instruction table. The example 800 shows instructions, timing, and pipeline stages for data transfer operations that include converting floating-point data to integer data. The timing diagram and associated instruction table example 800 includes an instruction table 810. The instruction table 810 includes column 811 which indicates the order of a given instruction. The instruction table 810 further includes column 812 which indicates the mnemonic form for a given instruction. The instruction table 810 includes column 813, which indicates the type and number of each operation shown in the example timing diagram. The instruction table 810 further includes column 814 that includes comments, where applicable, for a given instruction. The instruction table 810 further includes column 815, which indicates the latency for a given instruction. A lower latency value indicates that the instruction can complete in fewer clock cycles than an instruction with a higher latency value. Disclosed embodiments can support various latency operations, which include variable latency operations.

The instruction table 810 includes three rows, indicated as row 821, row 822, and row 823. Row 821 corresponds to a first instruction, FPADD (floating-point add). Row 822 corresponds to a second instruction, FCVT (floating-point convert), which is a hybrid instruction that is decoded into a data transfer operation that includes the transfer of an input operand using a floating-point data type to an output operand using an integer data type, hence the term "data transfer operation". Row 823 corresponds to a third instruction, ADD (integer add). The FPADD instruction is a first floating-point instruction, indicated by operation designator F1 at row 821, column 813, and has a latency of three cycles, as indicated at row 821, column 815. The FCVT instruction at row 822 is a hybrid instruction, which results in a data transfer operation. It is decoded into two operations, indicated as F2 and A1 in column 813. Operation F2 utilizes a floating-point hardware element such as an FPU, and operation A1 utilizes an integer hardware element such as an ALU. The operation F2 has a latency of three cycles, as indicated in column 815, and the operation A1 has a latency of one cycle, as indicated in column 815. The ADD instruction at row 823 is an integer instruction, indicated by operation designator A2 at row 823, column 813, and has a latency of one cycle, as indicated at row 823, column 815.

The hybrid instruction type that comprises a data transfer operation can include a floating-point operation and an integer operation. The integer operation can be a 16-bit operation, 32-bit operation, 64-bit operation, or some other suitable operation length. The latencies of the instructions at rows 821, 822, and 823 can be the same or different. Typically, however, the operations decoded from a hybrid instruction will have different latencies, because floating-point operations typically require more cycles to complete than integer operations. Nonetheless, any number of latency cycles for operation F2 and operation A1 can be managed by disclosed techniques. In embodiments, the first operation and the second operation of the data transfer operation have different latencies. In embodiments, the first operation of the data transfer operation is a floating-point operation and the second operation of the data transfer operation is a floating-point convert (FCVT) operation.

Example 800 further includes timing chart 820. The timing chart 820 includes a plurality of columns, indicated generally as 845, where each column indicates a particular clock cycle. Similarly, timing chart 820 includes a plurality of rows, indicated generally as 847, where each row corresponds to an operation in column 813 of instruction table 810. For a given row and column of timing chart 820, a pipeline stage is indicated. As an example, the pipeline stage E2 is indicated at the intersection of row F1 and column 5. As discussed earlier, a data transfer pipeline can include a wakeup stage (WU), a pick stage (P), a read stage (R), one or more execute stages, indicated generally as En, where n is an integer value corresponding to the number of the execution cycle included in a particular operation, and a writeback stage (WB). The wakeup stage may serve to initialize the pipeline, including any registers, signals, and/or other logic needed to begin execution of an operation. The pick stage can include selecting an operation out of an issue queue for execution, based on resources being available, especially source operands. The read stage indicates that the operands can be fetched and presented to an execution unit for operation execution. Each operation includes one or more execute stages, indicated as E1, E2, E3, and so on. Often, an integer operation comprises a single execute stage (E1). Floating-point instructions may require multiple execute stages. As an example, operation F1 (FPADD) includes three execute stages, indicated as E1 (at the intersection of row F1, and column 4), E2 (at the intersection of row F1, and column 5), and E3 (at the intersection of row F1, and column 6). The writeback stage can include writing results to register files, registers, and/or memory locations.

Referring again to the instruction table 810, row 822, the FCVT instruction (row 822, column 812) is a hybrid instruction. It operates on floating-point operands, and outputs an integer value. Described throughout, the FCVT instruction is separated into two operations: the floating-point operation indicated as F2 and the integer operation indicated as A1. Referring to column 815 of the instruction table 810, it is indicated that operation F2 requires three execute cycles and that operation A1 requires one execute cycle. Referring now to timing chart 820, it can be seen that operation F2 starts with the wakeup cycle at row F2, column 4, which allows its first execute state E1 to occur at column 7, which is after the final execute stage for the preceding instruction (E3, at row F1, column 6). In this way, operation F2, which is the first operation of the FCVT instruction, can proceed, because the needed data from the previous instruction is available. Similarly, the A1 operation, which is the second operation of the FCVT operation, starts with the wakeup cycle at row A1, column 7, which allows its execute state E1 to occur at column 10. In embodiments, the execution of operation F2 is performed using an FPU, while the execution of operation A1 is performed using an ALU. If the FCVT instruction were executed as a single, atomic instruction, instead of being separated into sub-instructions, it would require more clock cycles to pass control and data between the FPU and ALU using additional ports on register files. With disclosed embodiments, the data transfer operation pipelines, and their corresponding hardware elements, can be initialized and configured concurrently. Further, as soon as the preceding result is available from the FPU, it is provided to the ALU via additional logic and/or circuitry, as previously described.

The wakeup of operation A1, in column 7, and indicated by reference 830, occurs at the E1 stage of operation F2, which is indicated at row F2, column 7. The second stage for operation A1 is the pick, in column 8, and indicated by reference 840. The pick at 840 is referred to as a "forced pick" because the IQ control logic knows that the F2 result will be available during F2 E3, and thus the integer operation is selected for issue and reads the output of F2 in column 9 as its source operand. Operation A1 can then complete and write back its data (column 11) and provide its data to the next operation, A2. Thus, example 800 shows a hybrid instruction (FCVT) amidst a pure floating-point operation (F1) and a pure integer operation (A2) that includes converting a floating-point value to an integer value.

Figure 9:
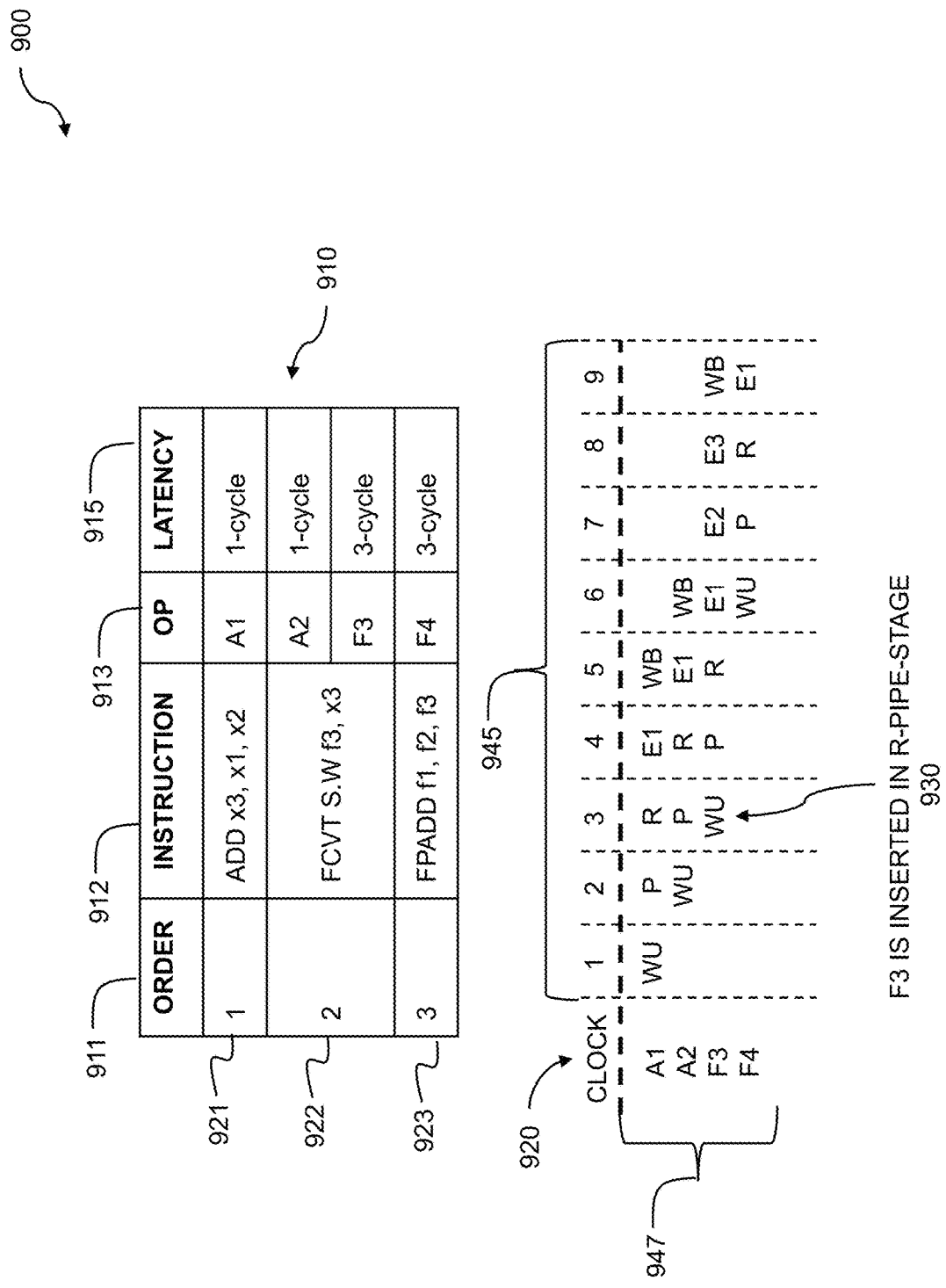
FIG. 9 shows an example I2F timing diagram and associated instruction table.

FIG. 9 shows an example I2F (integer to floating-point) timing diagram and associated instruction table. The timing diagram and associated instruction table example 900 show instructions, timing, and pipeline stages for operations that include converting integer data to floating-point data. The example 900 includes an instruction table 910. The instruction table 910 includes column 911 which indicates the order of a given instruction. The instruction table 910 further includes column 912 which indicates the mnemonic form for a given instruction. The instruction table 910 includes column 913, which indicates the type and number of each operation shown in example 900. The instruction table 910 further includes column 915, which indicates the latency for a given instruction.

The instruction table 910 includes three rows, indicated as row 921, row 922, and row 923. Row 921 corresponds to a first instruction, ADD. Row 922 corresponds to a second instruction, FCVT. Row 923 corresponds to a third instruction, FPADD. The ADD instruction is an integer instruction, indicated by operation designator A1 at row 921, column 913, and has a latency of one cycle, as indicated at row 921, column 915. The FCVT instruction at row 922 is a hybrid, data transfer operation instruction, and is decoded into two operations, indicated as A2 and F3 in column 913. Operation A2 is issued out of an integer, or ALU, issue queue (ALU IQ) and utilizes an integer hardware element such as an ALU; operation F3 is issued out of a floating-point issue queue (FP IQ) and utilizes a floating-point hardware element such as an FPU. The operation A2 has a latency of one cycle, as indicated in column 915, and the operation F3 has a latency of three cycles, as indicated in column 915. The FPADD instruction at row 923 is a floating-point instruction, indicated by operation designator F4 at row 923, column 913, and has a latency of three cycles, as indicated at row 923, column 915.

Example 900 further includes timing chart 920. The timing chart 920 includes a plurality of columns, indicated generally as 945, where each column indicates a particular clock cycle. While columns 1-9 are shown in the chart 920, in practice, the execution of instructions may continue beyond clock cycle 9. Similarly, the timing chart 920 includes a plurality of rows, indicated generally as 947, where each row corresponds to an operation in column 913 of instruction table 910. For a given row and column, a pipeline stage is indicated. As an example, the pipeline stage E1 is indicated at the intersection of row A1 and column 4. A pipeline can include a wakeup stage (WU), a pick stage (P), a read stage (R), one or more execute stages, indicated generally as En, where n is an integer value corresponding to the number of cycles required for a particular operation, and a writeback stage (WB), all discussed previously. As an example, operation F3 includes three execute stages, indicated as E1 (at the intersection of row F3, and column 6), E2 (at the intersection of row F3, and column 7), and E3 (at the intersection of row F3, and column 8).

Referring again to the instruction table 910, row 922, the FCVT instruction (row 922, column 912) is a hybrid instruction. It operates on integer operands, and outputs a floating-point value. In embodiments, the FCVT instruction is separated into two operations, indicated as A2 and F3. Referring to column 915 of the instruction table 910, it is indicated that operation A2 requires one execute cycle and operation F3 requires three execute cycles. Referring now to timing chart 920, it can be seen that operation A2 starts with the wakeup cycle at row A2, column 2, which allows its execute state E1 to occur at column 5, which is after the execute stage for the preceding instruction (E1, at row A1, column 4). In this way, operation A2, which is the first operation in the FCVT instruction, can proceed, as the needed data from the previous instruction is available. Similarly, the F3 operation, which is the second operation of the FCVT operation, starts with the wakeup cycle at row F3, column 3, which allows its execute state E1 to occur at column 6. In embodiments, the execution of operation A2 is performed using an ALU, while the execution of operation F3 is performed using an FPU.

The wakeup of operation F3, in column 3, and indicated by reference 930, is inserted in the read stage of instruction A1, and also coincides with the pick of operation A2, indicated at the intersection of row A2 and column 3. In embodiments, dependencies within the ALU can be implemented via an ALU dependency bit. In some embodiments, the clearing of the ALU dependency bit and forced pick are combined into the same clock cycle. The output of operation F3 produces a result for a subsequent floating-point instruction, indicated as F4 (at row 923, column 913 of table 910). Thus, example 900 shows a hybrid instruction (FCVT) that includes converting an integer value to a floating-point value.

Figure 10:
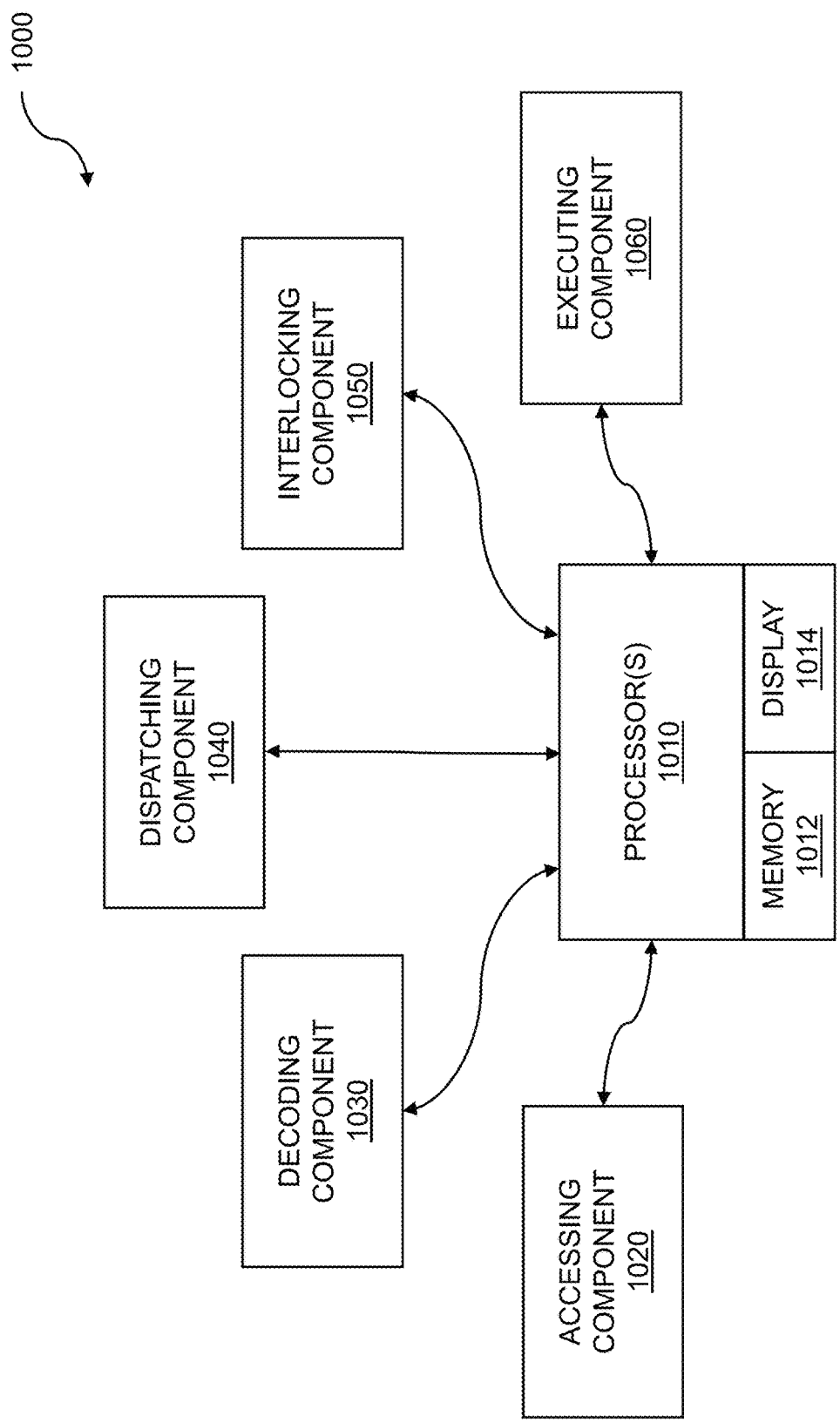
FIG. 10 is a system diagram for a processor pipeline for data transfer operations.

FIG. 10 is a system diagram for a processor pipeline for data transfer operations. The system 1000 can include instructions and/or functions for design and implementation of integrated circuits that implement a processor pipeline for data transfer operations. The system 1000 can include instructions and/or functions for generation and/or manipulation of design data such as hardware description language (HDL) constructs for specifying structure and operation of an integrated circuit. The system 1000 can further perform operations to generate and manipulate Register Transfer Language (RTL) abstractions. These abstractions can include parameterized inputs that enable specifying elements of a design such as a number of elements, sizes of various bit fields, and so on. The parameterized inputs can be input to a logic synthesis tool which in turn creates the semiconductor logic that includes the gate-level abstraction of the design that is used for fabrication of integrated circuit (IC) devices.

The system can include one or more of processors, memories, cache memories, displays, and so on. The system 1000 can include one or more processors 1010. The processors can include standalone processors within integrated circuits or chips, processor cores in FPGAs or ASICs, and so on. The one or more processors 1010 are attached to a memory 1012, which stores operations. The memory can include one or more of local memory, cache memory, system memory, etc. The system 1000 can further include a display 1014 coupled to the one or more processors 1010. The display 1014 can be used for displaying data, instructions, operations, and the like. The operations can include instructions and functions for implementation of integrated circuits, including processor cores. In embodiments, the processor cores can include RISC-V™ processor cores.

The system 1000 can include a processor accessing component 1020. The processor accessing component 1020 can include functions and instructions for processing design data for accessing a processor core. The processor core can include FPGAs, ASICs, etc. In embodiments, the processor core can include a RISC-V™ processor core. The processor core is coupled to an external memory system. The external memory system can include magnetic disk drives, optical disk drives, solid-state disks, and so on. The processor core can support instruction execution pipelines for data transfer operations as described previously. The processor core can execute one or more instructions out of order. The processor core can support integer operations and floating-point operations.

The system 1000 can include a decoding component 1030. The decoding component 1030 can include functions and instructions for decoding an instruction in the processor core, wherein the instruction comprises a data transfer operation, and wherein the data transfer operation necessitates a floating-point operation and an integer operation. The system 1000 can include a dispatching component 1040. The dispatching component 1040 can dispatch the floating-point operation and the integer operation to one or more issue queues.

The system 1000 can include an interlocking component 1050. The interlocking component 1050 can include functions for interlocking the floating-point operation and the integer operation, wherein the interlocking is accomplished using at least one entry in the one or more issue queues. The system 1000 can include an executing component 1060. The executing component 1060 can execute a first operation of the floating-point operation and the integer operation. The executing component 1060 can execute a second operation of the floating-point operation and the integer operation, based on the interlocking.

The system 1000 can include a computer program product embodied in a non-transitory computer readable medium for instruction execution, the computer program product comprising code which causes one or more processors to generate semiconductor logic for: accessing a processor core, wherein the processor core executes one or more instructions out of order, and wherein the processor core supports integer operations and floating-point operations; decoding an instruction in the processor core, wherein the instruction comprises a data transfer operation, and wherein the data transfer operation necessitates a floating-point operation and an integer operation; dispatching the floating-point operation and the integer operation to one or more issue queues; interlocking the floating-point operation and the integer operation, wherein the interlocking is accomplished using at least one entry in the one or more issue queues; executing a first operation of the floating-point operation and the integer operation; and executing a second operation of the floating-point operation and the integer operation, based on the interlocking.

Disclosed embodiments can include computer system for instruction execution comprising: a memory which stores instructions; one or more processors coupled to the memory wherein the one or more processors, when executing the instructions which are stored, are configured to: access a processor core, wherein the processor core executes one or more instructions out of order, and wherein the processor core supports integer operations and floating-point operations; decode an instruction in the processor core, wherein the instruction comprises a data transfer operation, and wherein the data transfer operation necessitates a floating-point operation and an integer operation; dispatch the floating-point operation and the integer operation to one or more issue queues; interlock the floating-point operation and the integer operation, wherein the interlocking is accomplished using at least one entry in the one or more issue queues; execute a first operation of the floating-point operation and the integer operation; and execute a second operation of the floating-point operation and the integer operation, based on the interlocking.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for instruction execution comprising:
   accessing a processor core, wherein the processor core executes one or more instructions out of order, and wherein the processor core supports integer operations and floating-point operations, wherein the integer operations and the floating-point operations include various latency operations, wherein the various latency operations include variable latency operations;

decoding an instruction in the processor core, wherein the instruction comprises a data transfer operation, and wherein the data transfer operation necessitates a floating-point operation and an integer operation;

dispatching the floating-point operation and the integer operation to one or more issue queues;

interlocking the floating-point operation and the integer operation, wherein the interlocking is accomplished using at least one entry in the one or more issue queues, wherein a request/grant protocol is employed for interlocking the variable latency operations;

executing a first operation of the floating-point operation and the integer operation; and executing a second operation of the floating-point operation and the integer operation, based on the interlocking.

2. The method of claim 1 wherein the one or more issue queues comprise a floating-point issue queue and an integer issue queue.

3. The method of claim 1 wherein a latency of the various latency operations determines one or more fields in corresponding entries of a floating-point issue queue and an integer issue queue.

4. The method of claim 1 wherein the at least one entry in the one or more issue queues includes one or more of a companion instruction queue identification, a dependency bit, and an operation type.

5. The method of claim 3 wherein the companion instruction queue identification, the dependency bit, and/or the operation type enable the interlocking at an instruction level.

6. The method of claim 1 wherein the at least one entry in the one or more issue queues includes a reorder buffer identification and/or an operand validity indication.

7. The method of claim 6 wherein the reorder buffer identification and/or the operand validity indication enable interlocking at an out-of-order instruction level.

8. The method of claim 1 wherein the interlocking enables marking the second operation eligible for issuing.

9. The method of claim 8 wherein the interlocking enables issuing an operation from an instruction queue to an execution unit.

10. The method of claim 9 wherein the interlocking enables a source operand for the second operation to be obtained from the first operation.

11. The method of claim 1 wherein the first operation comprises a floating-point operation and the second operation comprises an integer operation.

12. The method of claim 11 wherein the first operation is executed in a floating-point unit and the second operation is executed in an arithmetic logic unit.

13. The method of claim 12 wherein data resulting from the first operation is transferred directly from the floating-point unit to the arithmetic logic unit.

14. The method of claim 12 wherein data resulting from the first operation is transferred from the floating-point unit to the arithmetic logic unit using temporary register file storage.

15. The method of claim 1 wherein the first operation comprises an integer operation and the second operation comprises a floating-point element operation.

16. The method of claim 15 wherein the first operation is executed in an arithmetic logic unit and the second operation is executed in a floating-point unit.

17. The method of claim 16 wherein data resulting from the first operation is transferred directly from the arithmetic logic unit to the floating-point unit.

18. The method of claim 16 wherein data resulting from the first operation is transferred from the arithmetic logic unit to the floating-point unit using temporary register file storage.

19. The method of claim 1 wherein the data transfer operations include floating-point convert operations, floating-point move operations, floating-point compare operations, or floating-point class operations.

20. The method of claim 19 wherein the data transfer operations include single-precision floating-point operations and double-precision floating-point operations.

21. The method of claim 1 wherein the one or more instructions include vector floating-point instructions.

22. The method of claim 1 wherein the interlocking is managed by a decode unit.

23. A computer program product embodied in a non-transitory computer readable medium for instruction execution, the computer program product comprising code which causes one or more processors to generate semiconductor logic for:

accessing a processor core, wherein the processor core executes one or more instructions out of order, and wherein the processor core supports integer operations and floating-point operations, wherein the integer operations and the floating-point operations include various latency operations, wherein the various latency operations include variable latency operations;

decoding an instruction in the processor core, wherein the instruction comprises a data transfer operation, and wherein the data transfer operation necessitates a floating-point operation and an integer operation;

dispatching the floating-point operation and the integer operation to one or more issue queues;

interlocking the floating-point operation and the integer operation, wherein the interlocking is accomplished using at least one entry in the one or more issue queues, wherein a request/grant protocol is employed for interlocking the variable latency operations;

executing a first operation of the floating-point operation and the integer operation; and executing a second operation of the floating-point operation and the integer operation, based on the interlocking.

24. A computer system for instruction execution comprising:

a memory which stores instructions;

one or more processors coupled to the memory wherein the one or more processors, when executing the instructions which are stored, are configured to:

access a processor core, wherein the processor core executes one or more instructions out of order, and wherein the processor core supports integer operations and floating-point operations, wherein the integer operations and the floating-point operations include various latency operations, wherein the various latency operations include variable latency operations;

decode an instruction in the processor core, wherein the instruction comprises a data transfer operation, and wherein the data transfer operation necessitates a floating-point operation and an integer operation;

dispatch the floating-point operation and the integer operation to one or more issue queues;

interlock the floating-point operation and the integer operation, wherein the interlocking is accomplished using at least one entry in the one or more issue queues, wherein a request/grant protocol is employed for interlocking the variable latency operations;

execute a first operation of the floating-point operation and the integer operation; and execute a second operation of the floating-point operation and the integer operation, based on the interlocking.

\* \* \* \* \*